US010671616B1

(12) United States Patent
Frankle et al.

(10) Patent No.: US 10,671,616 B1
(45) Date of Patent: Jun. 2, 2020

(54) SELECTIVELY MODIFYING SCORES OF YOUTH-ORIENTED CONTENT SEARCH RESULTS

(71) Applicant: Google Inc., Mountain View, CA (US)

(72) Inventors: Jonathan Frankle, Los Gatos, CA (US); William Chambers, Mountain View, CA (US); Charles Thomas Curry, San Jose, CA (US); Eileen Margaret Peters Long, San Jose, CA (US)

(73) Assignee: Google LLC, Mountain View, CA (US)

( * ) Notice: Subject to any disclaimer, the term of this patent is extended or adjusted under 35 U.S.C. 154(b) by 652 days.

(21) Appl. No.: 14/628,289

(22) Filed: Feb. 22, 2015

(51) Int. Cl.
G06F 16/2457 (2019.01)
G06F 16/2455 (2019.01)

(52) U.S. Cl.
CPC .... *G06F 16/24578* (2019.01); *G06F 16/2455* (2019.01)

(58) Field of Classification Search
None
See application file for complete search history.

(56) References Cited

U.S. PATENT DOCUMENTS

| 6,295,559 | B1 * | 9/2001 | Emens | G06F 17/30 707/999.001 |
|---|---|---|---|---|
| 7,979,369 | B2 * | 7/2011 | Grenier | G06F 16/9535 706/20 |
| 8,095,545 | B2 * | 1/2012 | Telloli | G06F 17/30864 707/750 |
| 8,396,876 | B2 * | 3/2013 | Kennedy | G06F 17/30038 706/45 |
| 8,645,417 | B2 * | 2/2014 | Groeneveld | G06F 17/30657 707/758 |
| 8,943,536 | B2 * | 1/2015 | White | G06Q 30/02 725/44 |
| 8,996,495 | B2 * | 3/2015 | Rehman | G06F 16/24578 707/706 |
| 9,223,889 | B2 * | 12/2015 | Adekile | G06F 17/3089 |
| 2002/0078045 | A1 * | 6/2002 | Dutta | G06F 17/30675 |
| 2008/0155409 | A1 * | 6/2008 | Santana | G06F 17/30864 715/706 |
| 2008/0282338 | A1 * | 11/2008 | Beer | G06F 21/566 726/12 |
| 2010/0082434 | A1 * | 4/2010 | Chen | G06F 17/30867 705/14.55 |
| 2012/0150850 | A1 * | 6/2012 | Parthasarathy | G06F 17/30867 707/728 |
| 2013/0054572 | A1 * | 2/2013 | Cummins | G06F 17/30867 707/722 |
| 2013/0339347 | A1 * | 12/2013 | Hogan | G06F 17/30864 707/722 |

(Continued)

*Primary Examiner* — Jeff A Burke
(74) *Attorney, Agent, or Firm* — Lowenstein Sandler LLP

(57) ABSTRACT

A method for selectively modifying scores of youth-oriented content search results is disclosed. The method includes identifying a plurality of search results, with each search result being associated with one of a plurality of scores. The method further includes selecting a subset of search results from the plurality of search results, and selecting a subset of scores within the plurality of scores that includes scores associated with the selected subset of search results. The method further includes modifying each score of the subset of scores with a query-dependent factor.

19 Claims, 7 Drawing Sheets

(56) References Cited

U.S. PATENT DOCUMENTS

| | | | |
|---|---|---|---|
| 2014/0089288 A1* | 3/2014 | Ali | G06F 17/30864 |
| | | | 707/709 |
| 2014/0222792 A1* | 8/2014 | Groeneveld | G06F 17/30657 |
| | | | 707/723 |
| 2014/0236940 A1* | 8/2014 | Wirtz | G06F 17/30864 |
| | | | 707/730 |
| 2014/0380359 A1* | 12/2014 | Musil | H04N 21/6582 |
| | | | 725/34 |

* cited by examiner

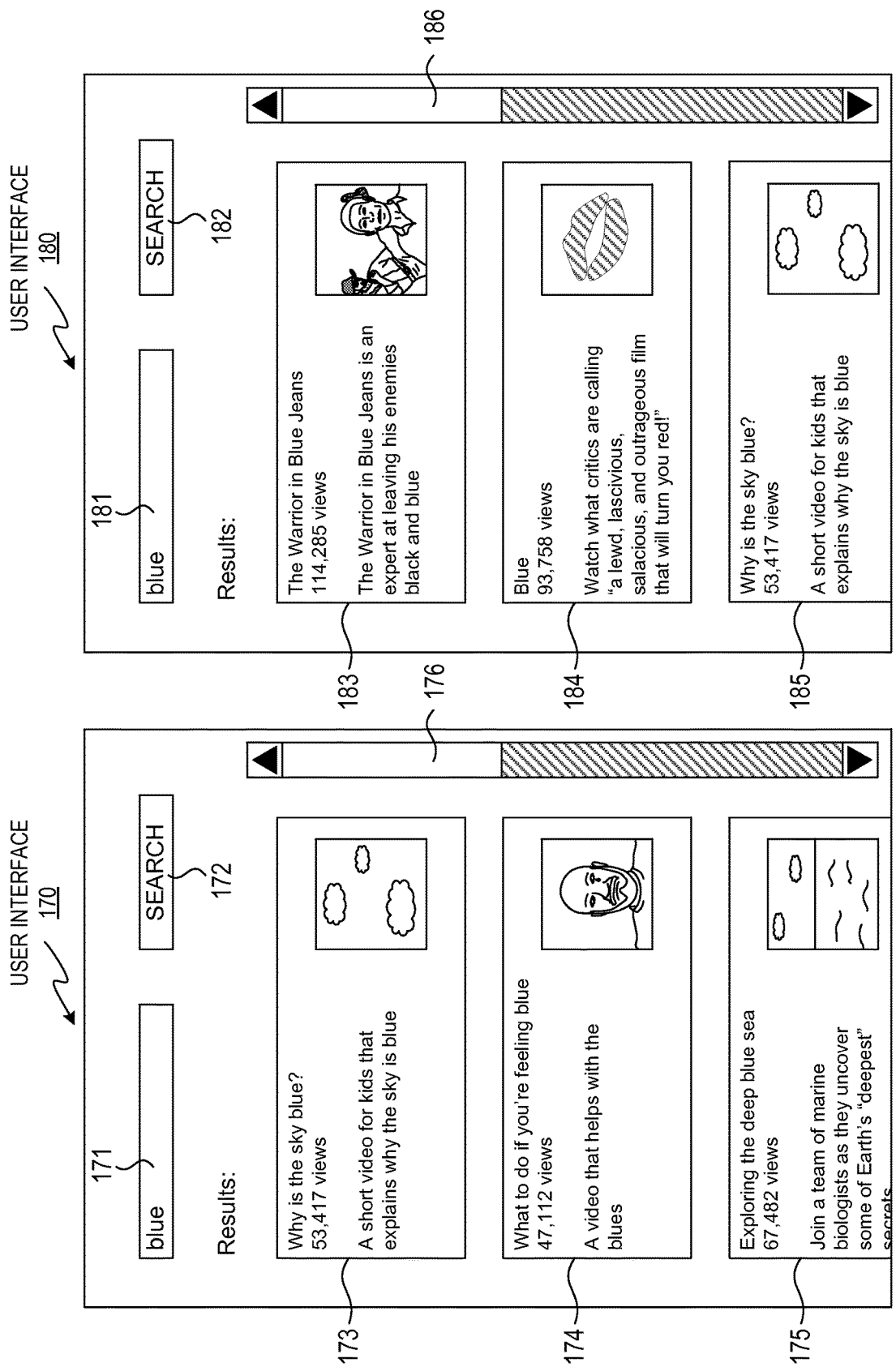

SELECTIVELY MODIFYING SCORES OF YOUTH-ORIENTED CONTENT SEARCH RESULTS

TECHNICAL FIELD

This disclosure relates to the field of content sharing platforms, in particular, to modifying scores of content search results by selectively modifying scores of youth-oriented search results.

BACKGROUND

On the Internet, social networks allow users to connect with each other and share information. Many social networks include a content sharing aspect that allows users to upload, view, and share content, such as video content, image content, audio content, and so on (which may be collectively referred to as "media items", "media content", "content items", or "content"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, listen to digital music, read articles, etc.). Some content may have an assigned content rating, which serves as an indication as to the age appropriateness of the content.

SUMMARY

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In one implementation, a method for selectively modifying scores of content search results based on a content label, such as a youth-oriented content label, is disclosed. The method includes identifying, by a processing device, a plurality of search results corresponding to a search query generated at a client device, each search result of the plurality of search results being associated with a content label and with one of a plurality of scores. The method further includes selecting, by the processing device, a subset of search results within the plurality of search results based at least partially on the associated content label of each search result. The method further includes selecting, by the processing device, a subset of scores within the plurality of scores, the subset of scores including scores associated with the selected subset of search results. The method further includes computing, by the processing device, a query-dependent factor based at least partially on the plurality of scores, and modifying each score of the subset of scores with the query-dependent factor.

In another implementation, a method for selectively modifying scores of youth-oriented search results is disclosed. The method includes identifying, by a processing device, a plurality of search results that are restricted to search results assigned a first content label (e.g., a youth-oriented content label) or a second content label (e.g., a general audience content label). The method further includes, for a given search result, determining whether the given search result is assigned a youth-oriented content label and whether the search result has an associated relevance value that meets a relevance threshold. The method further includes, in response to determining that the given search result is assigned the youth-oriented content label and that the relevance value meets the relevance threshold, computing a query-dependent factor based on a score associated with the selected search result, and multiplying the score by the query-dependent factor.

In one or more of the disclosed implementations, computing devices for performing the operations of the above described implementations are also disclosed. Additionally, in implementations of the disclosure, a machine-readable storage medium stores instructions for performing the operations of the above described implementations.

BRIEF DESCRIPTION OF THE DRAWINGS

The present disclosure is illustrated by way of example, and not by way of limitation, in the figures of the accompanying drawings, in which:

FIG. 1C illustrates an example user interface presenting search results in which scores of youth-oriented search results were modified in accordance with an implementation of the disclosure;

FIG. 1D illustrates an example user interface presenting search results without utilizing modifying scores of youth-oriented search results;

DETAILED DESCRIPTION

Figure 1A:
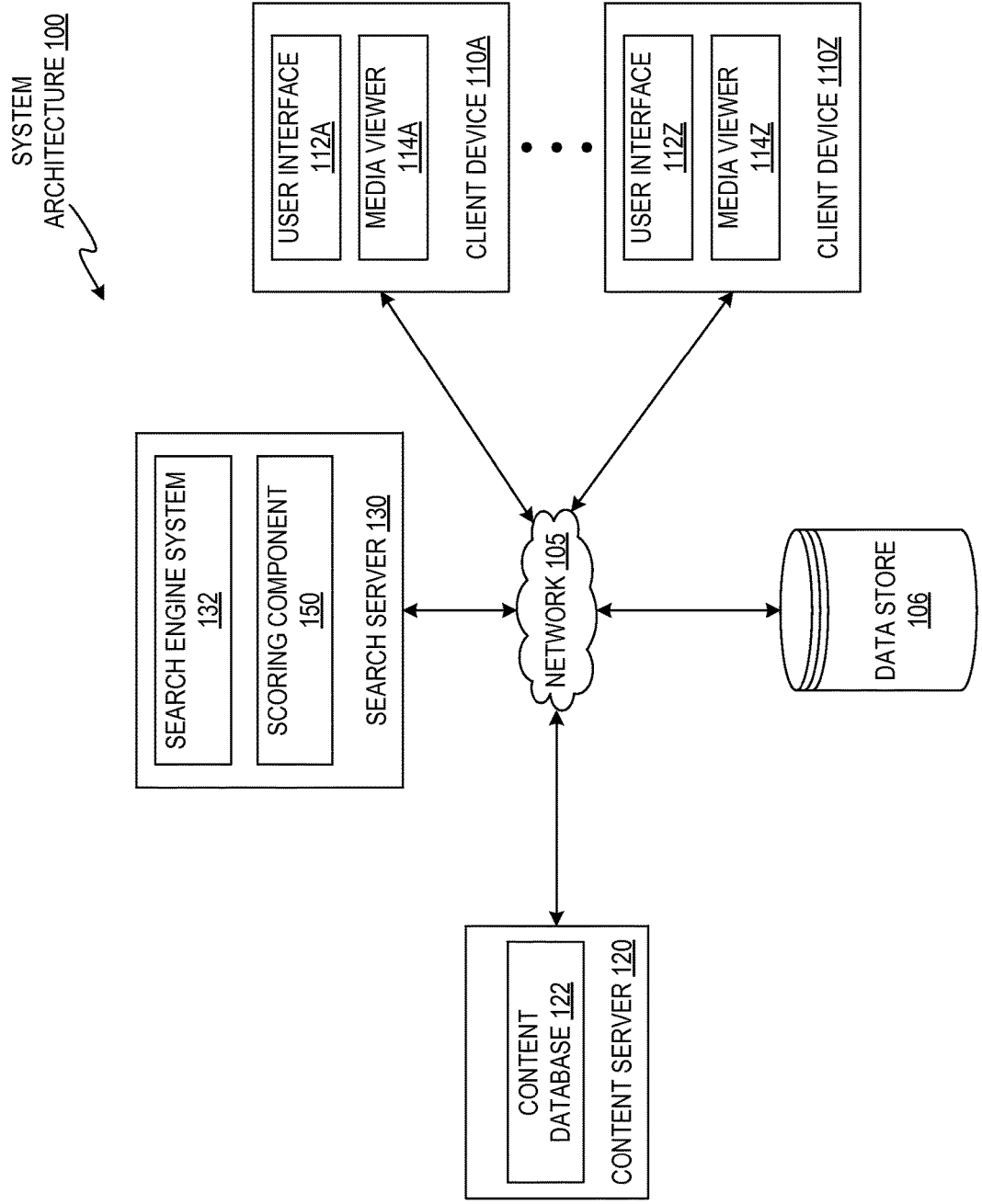
FIG. 1A illustrates an example system architecture in accordance with an implementation of the disclosure.

Implementations are described for selectively modifying scores of youth-oriented content search results. Content search results retrieved by a search engine are generally ranked based on a score assigned by the search engine. For example, the score may depend on relevance to a search query and/or other quality measures, such as logged past behavior of users. For content labeled as having particular interest to younger users (e.g., labeled as "youth-oriented"), raw scores may be boosted, for example, by a multiplicative or additive factor. In some implementations, the factor is a query-dependent factor derived from data generated by a search engine system for a particular search query. In some examples, the boost may be further restricted to results that meet a minimum relevance threshold (e.g., a relevance value of the search result assigned by the search engine is equal to or exceeds the relevance threshold). The boost may be applied uniformly across each of the youth-oriented search results (e.g., each youth-oriented search result score is scaled by a factor of 5), or may be applied non-uniformly across each of the youth-oriented search results (e.g., some may be scaled by a factor of 5, others by a factor of 4, etc.). For example, a variable boost may be computed depending on a distribution of search results for a current search query. Different forms of boosting could be used (e.g., multiplicative factors, additive factors, exponential factors, etc., and combinations thereof). In some examples, the boost may also factor in other parameters, such as scores of other search results, other indicators of "youth appeal", search history, view history, etc.

Content is often assigned a content label indicating suitability for a particular audience, such as "Y" (young), "G" (general), "PG" (parental guidance), "TEEN" (teenager), "MA" (mature audience), and "X" (adult/X-rated). Both "Y"-rated (e.g., youth-oriented) and "G"-rated (e.g., general audience) content is generally considered to be safe for children, but safety alone does not imply that it will be engaging or interesting to children. Solutions for providing youth-focused content searches that simply restrict search results based on content labels are disadvantageous. For example, restricting search results to "Y"-rated content may reveal content that is of interest to children under 8 years old, but may be of little interest to older children. Similarly, restricting search results to "G"-rated content would be safe for all ages, but would likely be of little interest to younger children. Restricting search results to "Y"-rated and "G"-rated content without any sort of modification to the raw scores of the search results would lead to a similar scenario as a "G"-rated restriction, as there is often much more "G"-rated content than "Y"-rated content. In such cases, content geared towards younger viewers is highly unrepresented in the search results since youth-oriented content is typically not scored as high as general audience content by search engines.

Aspects of the present disclosure address the above deficiencies by improving the mix of search results to include more content that a broad base of children will find interesting (e.g., ages 2-12). The disclosed implementations provide for dynamic re-scoring of raw search results restricted to "safe" content by giving selective treatment to content labeled as being youth-oriented. The disclosed implementations increase the overall appeal of content search results to children in general without alienating older children.

FIG. 1A illustrates an example system architecture 100, in accordance with an implementation of the disclosure, for selectively modifying scores of youth-oriented content search results. The system architecture 100 includes client devices 110A-110Z, a data store 106, a content server 120, and a search server 130, with each device of the system architecture 100 being communicatively coupled via a network 105. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and the data store 106 may configured to provide secure storage for private data.

The client devices 110A-110Z may each include computing devices such as personal computers (PCs), laptops, mobile phones, smart phones, tablet computers, netbook computers, etc. Client devices 110A-110Z may also be referred to as "user devices" or "mobile devices". An individual user may be associated with (e.g., own and/or use) one or more of the client devices 110A-110Z. The client devices 110A-110Z may each be owned and utilized by different users at different locations. As used herein, a "user" may be represented as a single individual (e.g., an adult or a child). However, other implementations of the disclosure encompass a "user" being an entity controlled by a set of users and/or an automated source. For example, a set of individual users federated as a community in a social network may be considered a "user".

The client devices 110A-110Z may each implement user interfaces 112A-112Z, respectively. Each of the user interfaces 112A-112Z may allow a user of the respective client device 110A-110Z to send and receive information to/from each other, the data store 106, the content server 120, and the search server 130. For example, one or more of the user interfaces 112A-112Z may be a web browser interface that can access, retrieve, present, and/or navigate content (e.g., web pages such as Hyper Text Markup Language (HTML) pages) provided by the content server 120. As another example, one or more of the user interfaces 112A-112Z may allow a user of a respective client device 110A-110Z to submit a search query (e.g., a string of text) to the search server 130, which may in turn provide a plurality of search results to the respective client device 110A-110Z. For example, if a user of the user interface 112A of the client device 110A submits a search query to the search server 130, the search server 130 may return a set of scored search results, which may be presented for display by the user interface 112A as a ranked list based on respective scores for each search result. The user may select one of the search results in order to retrieve associated content (e.g., a document, a website, video content, an image, music, etc.) from the content server 120 (or the search server 130 may facilitate the retrieval of the content from the content server 120 on behalf of the client device 110A). In one implementation, one or more of the user interfaces 112A-112Z may be a standalone application (e.g., a mobile "app", conferencing software, etc.), that allows a user of a respective client device 110A-110Z to send and receive information to/from each other (e.g., user-shared content), the content server 120, and the search server 130. FIGS. 1C and 1D discussed further below provide examples of user interfaces presenting search results.

Each client device 110A-110Z also includes a media viewer 114A-114Z, respectively, that is implemented by a respective user interface 112A-112Z. In one implementation, the media viewers 114A-114Z may be applications that allow users to view content, such as images, videos, web pages, documents, etc. The media viewer 114A, for example, may be a web browser that can access, retrieve, present, and/or navigate content (e.g., web pages such as Hyper Text Markup Language (HTML) pages, digital media items, etc.) provided by a web server. The media viewer 114A may render, display, and/or present the content (e.g., a web page, a media viewer) to a user. The media viewer 114A may also display an embedded media player that is embedded in a web page. In another example, the media viewer 114A may be a standalone application (e.g., a mobile "app" or an application running on a network connected television) that allows users to view digital media items (e.g., digital videos, digital images, electronic books, etc.). The media viewers 114A-114Z may be provided to the client devices 110A-110Z (e.g., as downloadable software) by the content server 120, the search server 130, or any other suitable source.

In one implementation, the content server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items, and/or provide the media items to the user. The content server 120 may be a server utilized by any of the client devices 110A-110Z or the search server 130 to retrieve/access content or information pertaining to content (e.g., content metadata including a title, a genre, a content label, etc.).

In some implementations, the content server 120 may serve as a source of content that may be provided to any of the devices of the system architecture 100. In some implementations, more than one content server 120 may be utilized, with some specializing in particular types of content (e.g., a first content server that hosts video content, another content server that hosts music, etc.). The content server may host shared content, private content (e.g., content restricted to use by a single user or a group of users), commercially distributable content (e.g., on-demand content, purchasable content, etc.). In one implementation, the content server 120 maintains a content database 122, which includes records of all available content, including content titles, descriptions, ratings (e.g., including content labels such as "youth-oriented" and "general audience"), cross-references to related content or associated content, copyright information, licensing information, etc. In some implementations, the content server 120 may be combined with the search server 130 and/or the data store 106.

In one implementation, the search server 130 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to process a search queries received from the client devices 110A-110Z, generate lists of search results based on the search queries, and provide the search results to the requesting client devices 110A-110Z. The search server 130 includes a search engine system 132 and a scoring component 124.

In one implementation, the search engine system 132 may receive a search query (e.g., from one of the client devices 110A-110Z) and generate a set of search results of content items relevant to the search query, which may be subsequently transmitted back to the client device from which the query originated. The search engine system 132 may search for content items related to the search query (e.g., by searching descriptions of content from the content database 122, searching the body of web documents on the content server 120 or data store 106, etc.), for example, using any suitable search algorithm. The search engine system 132 may generate a set of search results by identifying content items relevant to the search query and generating a score for each content item. The search and scoring methodology performed by the search engine system 132 is outside of the scope of the present disclosure.

In some implementations, a relevance value may be computed for each of the search results, which may be used to narrow down the results by removing results that fail to meet a relevance threshold. The relevance value may be a trust value (e.g., an estimate of a likelihood that the search result is relevant), a volume value (e.g., a measure of an amount of evidence that the search result is relevant for the search query), other suitable measures of relevancy (as would be appreciated by one of ordinary skill in the art), or combinations thereof (e.g., a topicality value that is derived from combining a trust value with a volume value). In some implementations, the relevance value is a value ranging from 0 to 1, inclusive.

Although each of content server 120, search server 130, and data store 106 are depicted in FIG. 1A as single, disparate components, these components may be implemented together in a single device or networked in various combinations of multiple different devices that operate together. Examples of such devices may include, but are not limited to, servers, mainframe computers, networked computers, process-based devices, and similar types of systems and devices. Some implementations of the disclosure may operate within a single server device or on multiple server devices. Other implementations of the disclosure may operate in a standalone system. In some implementations, one or more of the content server 120 or the search server 130 are managed by a single entity. In some implementations, one or more of the content server 120 or the search server 130 are managed by different entities.

In general, functionality described in one implementation as being performed by the content server 120 or the search server 130 can also be performed by any of the client devices 110A-110Z in other implementations where appropriate. For example, the client device 110A may implement a software application that performs the functions of the scoring component 150. In addition, the functionality attributed to a particular component can be performed by different or multiple components operating together. The content server 120 and the search server 130 can also be accessed as services provided to other systems or devices through appropriate application programming interfaces, and thus are not limited to use in websites.

Figure 1B:
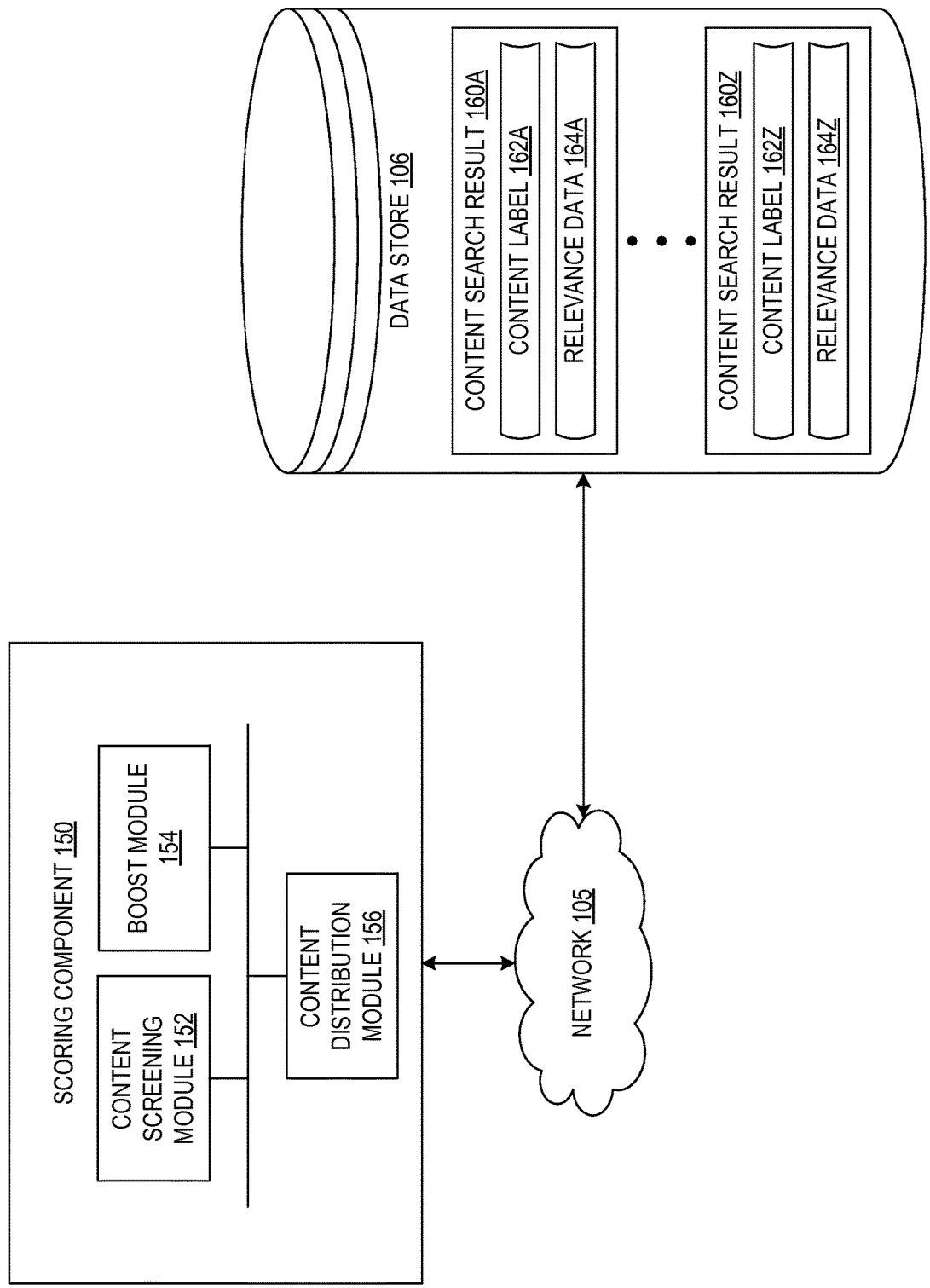
FIG. 1B is a block diagram illustrating a scoring component in accordance with an implementation of the disclosure.

FIG. 1B is a block diagram illustrating a scoring component in accordance with an implementation of the disclosure. In one implementation, the scoring component 150 includes a content screening module 152, a boost module 154, and a content distribution module 156. More or fewer components may be included in the scoring component 150 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the scoring component 150 is communicatively coupled to the data store 106. For example, the scoring component 150 may be coupled to the data store 106 via a network (e.g., via network 105 as illustrated in FIGS. 1A and 1B). In another example, the scoring component 150 may be coupled directly to a server where the scoring component 150 resides (e.g., may be directly coupled to the search server 130). As described with respect to FIG. 1A, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers), and may be cloud-based. Data store 106 may be part of or distributed between any of the client devices 110A-110Z, the content server 120, and the search server 130, as described with respect to FIG. 1A.

In one implementation, the data store 106 includes content search results 160A-160Z corresponding to retrievable content items identified (e.g., by the search engine system 132) as residing on the content server 120 or on any other content source. Each of the content search results 160A-160Z may have been generated by the search engine system 132, with each including, respectively, content labels 162A-162Z (e.g., which may have been previously assigned to their respective content items and stored in the content database 122) and relevance data 164A-164Z (e.g., initial scores/rankings generated by the search engine system 132, relevance values, etc.). In one implementation, the content search results 160A-160Z may be stored on a search server (e.g., the search server 130).

In some implementations, scoring component 150 may identify a plurality of search results generated by the search engine system 132. The search engine system 132 may restrict the search to find content associated with specific label types. In an illustrative implementation, the search engine system 132 performs a "joint" search in which the search is restricted to youth-oriented content and general audience content. In another illustrative implementation, the search engine system 132 performs two separate searches based on the search query: a first search restricted to youth-oriented content, and a second search restricted to general audience content. In each of these illustrative implementations (e.g., screening after identifying search results, a "joint" search, or separate searches), the scoring component 150 receives search results associated with a youth-oriented content label (e.g., "Y"-rated content, denoted by set Y) and a general audience content label (e.g., "Y"-rated content, denoted by set G).

In one implementation, the scoring component 150 utilizes the screening module 152 to select a subset of the identified search results for which a score boost is to be applied. In some implementations, the screening module selects the set Y as the subset. In some implementations, the screening module may select a subset of Y as the subset (a set $Y_S$). For example, the screening module 152 may select as the subset $Y_S$ only those scores associated with set Y that meet a scoring condition (e.g., $Y_S$ may correspond to the top 50 highest scored search results of the set Y). In another implementation, the screening module 152 may select, as the subset, search results from the set Y that have associated relevance values meeting a relevance condition. For example, $Y_S$ may be a set containing all search results, R, from the set Y that have associated relevance values satisfying the following condition:

$$\text{trust}(R) \geq T, \quad (\text{Eq. 1})$$

where trust(R) is a trust value (e.g., a type of relevance value) associated with the search result, R, and T is a trust threshold (e.g, a type of relevance threshold). The trust threshold, T, may be, in some implementations, a value ranging from 0 to 1, inclusive. In some implementations, T may be 0.5, 0.6, 0.7, 0.75, 0.8, 0.85, 0.9, or 0.95, for example. In one implementation, the scoring component 150 may utilize the boost module 154 to modify scores of search results selected by the screening module 152 (e.g., a subset of search results corresponding to the set Y or the set $Y_S$). For example, the boost module 154 may add a boost factor (e.g., denoted by a constant, k) to scores according to:

$$\text{score'}(R) = \text{score}(R) + k, \quad (\text{Eq. 2})$$

where R represents a youth-oriented search result (a search result associated the set Y or subset $Y_T$) identified by the screening module 152, score(R) is a raw score associated with R (e.g., generated by the search engine system 132), and score'(R) is a modified score associated with R. As another example, the boost module 154 may scale scores by the boost factor according to:

$$\text{score'}(R) = k * \text{score}(R), \quad (\text{Eq. 3})$$

In some implementations, the score modifications may be applied uniformly to each search result selected by the screening module 152. In other implementations, the score modifications may be applied non-uniformly to each search result selected by the screening module 152. For example, k value may be computed as a function of a particular score to be modified, based on a statistical relationship derived from the search results, or any other suitable method. In some implementations, different equations may be applied to different scores when the scores satisfy certain conditions. For example, Eq. 2 may be applied to a score having an associated relevance value within a first range, and Eq. 3 may be applied to a score having an associated relevance value within a second range.

In one implementation, the boost factor is a query-dependent factor derived from values associated with the search results (e.g., scores, relevance values, etc.). For example, a logging factor, $S_L$, may be computed for a particular score according to:

$$S_L(R) = \text{score}(R)/\text{trust}(R), \quad (\text{Eq. 4})$$

where trust(R) is a trust value associated with the search result, R. In some implementations, a query-dependent factor, k(R), may be computed as function of $S_L(R)$.

In one implementation, a query-dependent factor may be computed according to:

$$k_p = p\text{'th percentile } S_L\{G\}/p\text{'th percentile } S_L\{Y\}, \quad (\text{Eq. 5})$$

which corresponds to a ratio of a p'th percentile logging factor for scores within the set G to a p'th percentile logging factor for scores within the set Y. For example, if p=50, then $k_p$ is a ratio of the median log factor for scores within the set G to the median logging factor for scores within the set Y. In some implementations, Eqs. 2 and 3 may be modified to include a query-dependent boost factor, such as $k_p$ of Eq. 5.

Factors, such as k and $k_p$, may be used as multiplicative factors to preserve ratios of scores within both the Y and G sets. Uniform scaling aims to compensate all Y results equally for the dearth of logging data. In some implementations, Y scores with higher $S_L(R)$ are scaled by smaller factors, on the assumption that they have larger fractions of $S_L$ driven by 'crossover' (i.e., general audience) traffic. It is noted that the set Y and the set G may vary depending on how the search was performed, which would yield different results when computing Eq. 5. For example, the search results of the set Y for a joint search (as discussed above) may be different than if separate search queries were used to identify the set Y.

In some implementations, other query-dependent factors may be used, such as:

$$k_F = k_p * F(Y(q)),\quad \text{(Eq. 6)}$$

where Y(q) represents a "youth intent" probability (e.g., ranging from 0 to 1) computed based on statistics for the Y and G results. The function, F(Y(q)), may be a continuous or discontinuous function of Y(q) to further control when a boost is applied. For example, F(Y(q))=1 for a 50% youth intent (i.e., Y(q)=0.5) in some implementations. In one implementation, Y(q) is derived from counts of search results in each of sets G and Y and average trust values for each set.

In some implementations, other criteria may be utilized in computing the query-dependent factor. For example, in some implementations, a greater boost may be applied to scores of content that directly includes references to children. For example, the boost module 154 may generate a different score for search results having associated metadata (e.g., stored in the content database 122) that includes youth-oriented keywords, such as "kids", "children", "young", etc. In some implementations, video processing may be performed on content (e.g., by the content server 120) to identify likenesses of children in video content, and may update the associated metadata to indicate as much. In some implementations, metadata/descriptions associated with content may be edited/added by users of one or more of the client devices 110A-110Z, and the descriptions may have been modified based on crowd-sourced review. In such cases, a reviewer may have included, for example, a phrase that reads "great video for kids". The content screening module 152 may identify youth-oriented keywords in such data, and the boost module 154 may modify a score of associated content accordingly. In some implementations, a boost may be a function of a number of times a youth-oriented keyword appears in the metadata/description associated with a search result.

In one implementation, the scoring component 150 may utilize the content distribution module 156 to transmit the search results and associated scores to a client device from which the search query originated. In one implementation, the search results transmitted to the client device correspond to those having associated scores that meet a scoring condition (e.g., scores being of a subset of top-rated scores, scores being equal to or above a threshold score, etc.). The content distribution module 156 may further facilitate the transfer of content to the client device. For example, in response to a selection of a search result at the client device, the content distribution module 156 may cause the associated content to be transferred to the client device (e.g., from the content server 120).

The scoring component 150 was described as being implemented by the search server 130 described with respect to FIG. 1B, but may be implemented by any of the client devices 110A-110Z or the content server 120. For example, a client device (e.g., client device 110A) may be programmed to perform all of the functions of the scoring component 150. When the scoring component 150 is implemented on a client device, any functions described with respect to the scoring component 150 that "receive", "transmit", "retrieve", "identify", "determine", etc., are understood to refer to functions performed by sub-systems or sub-modules within the client device rather than across a network (e.g., the network 105), as would be appreciated by one of ordinary skill in the art.

FIG. 1C illustrates an example user interface 170 presenting search results in which scores of youth-oriented search results were modified in accordance with an implementation of the disclosure. For example, the user interface 170 may correspond to one of the respective user interfaces 112A-112Z of the client devices 110A-110Z. The user interface 170 includes a search box 171 for entering a search string (e.g., "blue"), and a search button 172 that causes a search request for "blue" to be transmitted to a search engine (e.g., the search engine system 132). The search results 173-175 are displayed, and a scrollbar 176 indicates the availability of additional search results below. As illustrated, the search results for "blue" include youth-oriented content and general audience content. For example, the search results 173 and 174 are videos specifically designed for a young audience, while the search result 175 corresponds to content that would be safe for a general audience. The search results 173 and 174 may have been promoted to the top of the search results 173-175 based on one or more boosts applied to their respective scores.

FIG. 1D illustrates an example user interface 180 presenting search results without utilizing modifying scores of youth-oriented search results. The user interface 180 includes a search box 181, a search button 182, a scrollbar 186, and search results 183-185. The search results 183-185 illustrated correspond to potential search results that may be generated if no youth-oriented or general audience restrictions applied and youth-oriented search result scores are not selectively modified. For example, the top search result 183, while relevant, may be unsuitable for children due to the nature of its content. The search result 184 may be considered adult content, and may or may not be present depending on whether an adult content filter is utilized. The search result 185 may correspond to the same content as the search result 173, except its score is comparatively lower than the search results 183 and 184 in this example.

Figure 2:
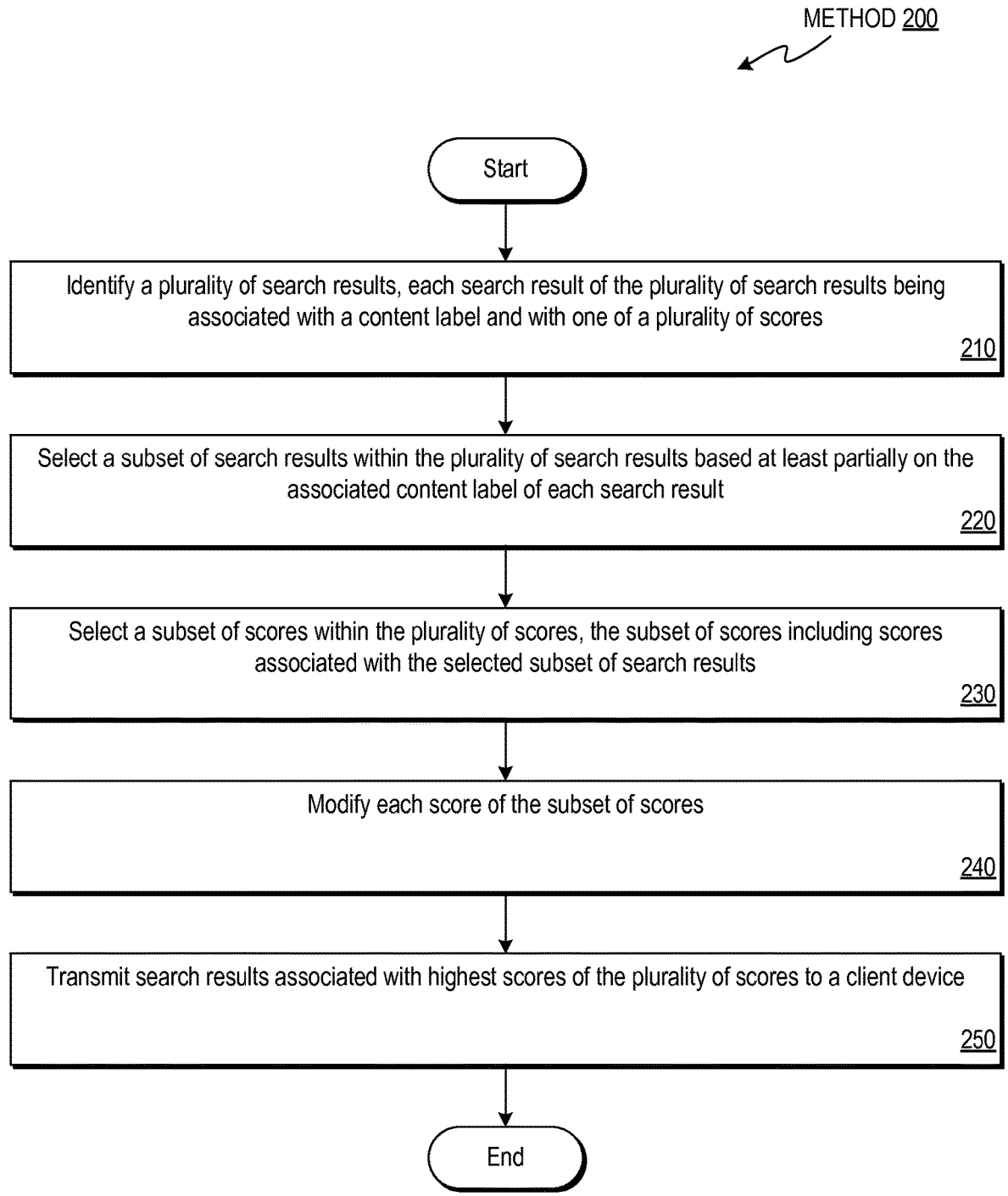
FIG. 2 is a flow diagram illustrating a method for selectively modifying scores of content search results based on a content label in accordance with an implementation of the disclosure.
Figure 3:
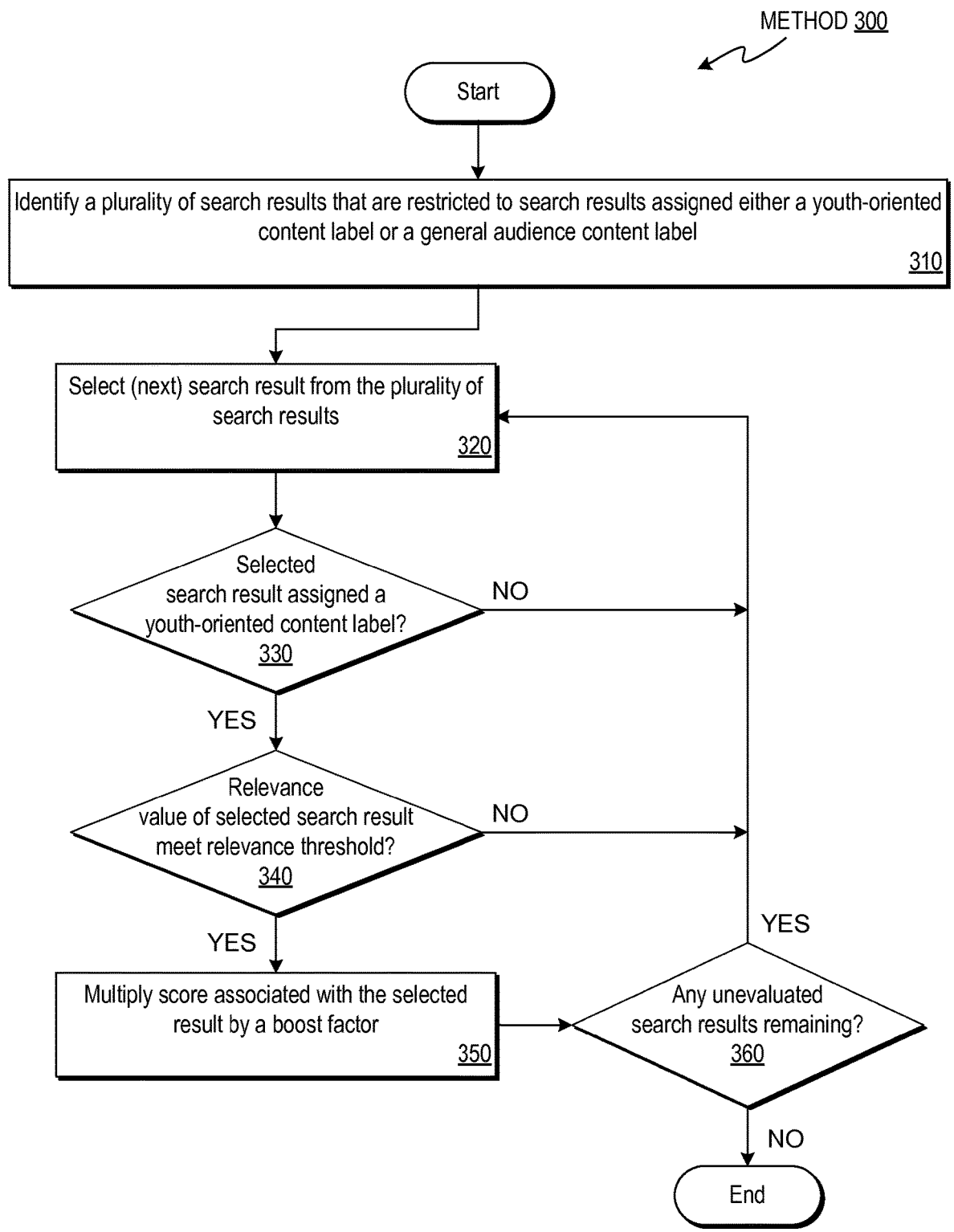
FIG. 3 is a flow diagram illustrating a method for selectively modifying scores of youth-oriented search results in accordance with an implementation of the disclosure.
Figure 4:
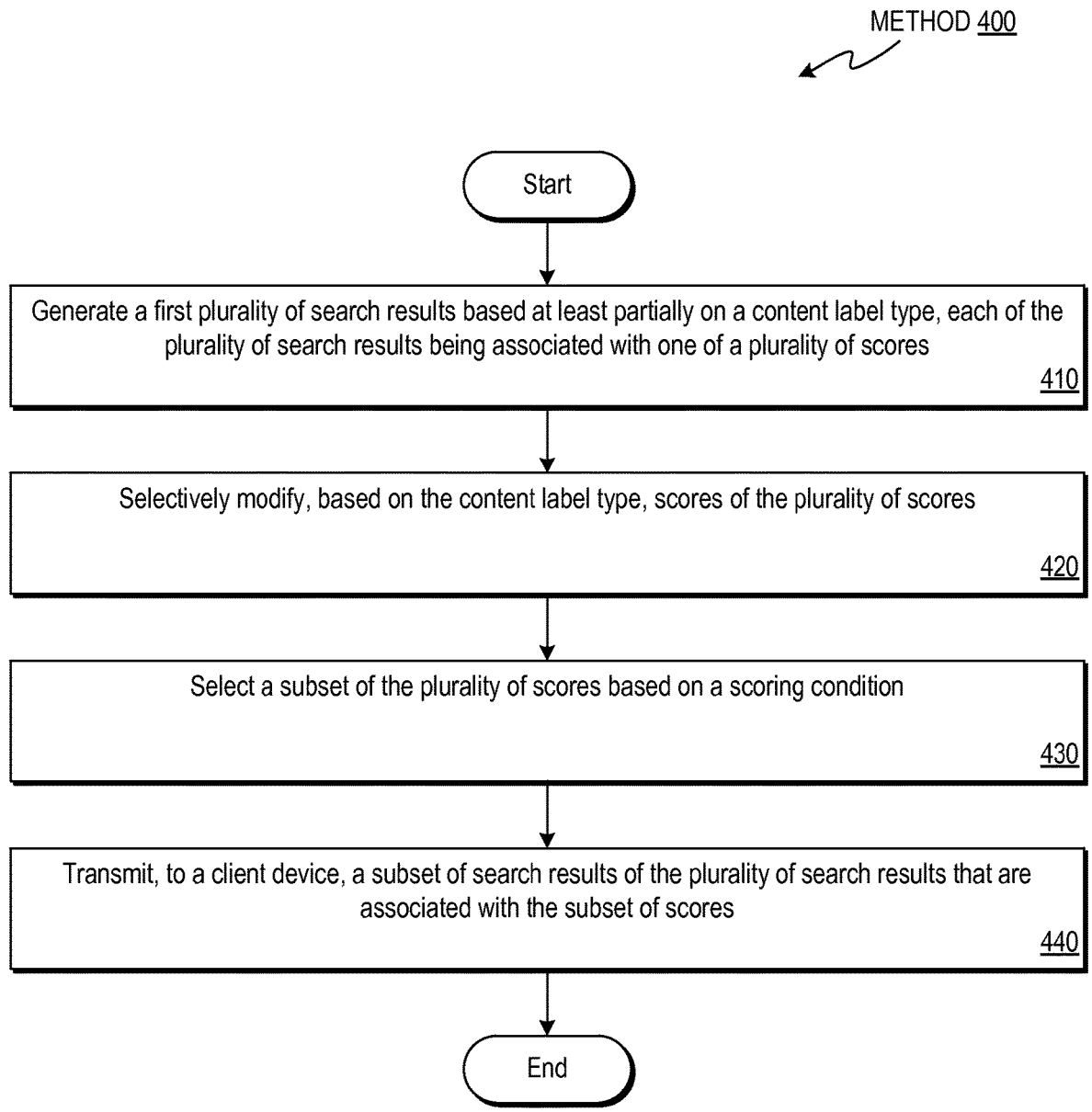
FIG. 4 is a flow diagram illustrating a method for promoting and selectively modifying potentially underrepresented search results in accordance with an implementation of the disclosure.

FIG. 2 is a flow diagram illustrating a method 200 for selectively modifying scores of content search results based on a content label in accordance with an implementation of the disclosure. FIG. 3 is a flow diagram illustrating a method 300 for selectively modifying scores of youth-oriented search results in accordance with an implementation of the disclosure. FIG. 4 is a flow diagram illustrating a method 400 for promoting and selectively modifying potentially underrepresented search results in accordance with an implementation of the disclosure. The methods 200, 300, and 400 may be performed by processing logic that includes hardware (e.g., circuitry, dedicated logic, programmable logic, microcode, etc.), software (e.g., instructions run on a processing device to perform hardware simulation), or a combination thereof. In one implementation, the methods 200, 300, and 400 may each be performed by a processing device executing the scoring component 150 described with respect to FIGS. 1A and 1B.

Referring to FIG. 2, the method 200 begins at block 210 when a processing device identifies a plurality of search results, with each search result of the plurality of search results being associated with a content label and with one of a plurality of scores. For example, the content label may be a content label indicative of youth-oriented content (e.g., "Y"-rated content), general audience content (e.g., "G"-rated content), or other types of content. In one implementation, identifying the plurality of search results includes receiving the plurality of search results from a search engine (e.g., the search engine system 132). In one implementation, the identified plurality of search results is restricted to search results each having a content label selected from a first content label type (e.g., a youth-oriented content label) and a second content label type (e.g., a general audience content label). The plurality of search results may have been generated in response to a search query generated at and received from a client device (e.g., one of the client devices 110A-110Z). In one implementation, the search results may have been generated in response to a joint search restricted to the first content label type and the second content label type. In one implementation, the search results may include search results generated in response to two or more separate searches each restricted to the first content label type, the second content label type, or more content label types.

At block 220, the processing device selects a subset of search results within the plurality of search results based at least partially on the associated content label of each search result (e.g., using the screening module 152). In one implementation, selecting the subset of the plurality of search results includes identifying search results each having an associated content label indicative of youth-oriented content (e.g., yielding a youth-oriented subset of the plurality of search results). In one implementation, each search result of the plurality of search results is further associated with a relevance value, and selecting the subset of the plurality of search results further includes identifying search results having respective relevance values that meet a relevance threshold (e.g., a trust value that is greater than or equal to a trust threshold, as described with respect to Eq. 1).

At block 230, the processing device selects a subset of scores within the plurality of scores (e.g., using the screening module 152), with the subset of scores including scores associated with the selected subset of search results.

At block 240, the processing device modifies each score of the subset of scores (e.g., using the boost module 154). In one implementation, each of the scores of the subset is modified by a constant factor. In one implementation, each of the scores of the subset is modified by a variable factor (e.g., that is a function of the score being modified, or another value associated with the respective search result of the score). In one implementation, the scores of the subset of scores are modified uniformly (e.g., each score of the subset is given the same treatment). In one implementation, the subset of scores are modified non-uniformly (e.g., by a variable factor).

In one implementation, each of the scores of the subset of scores is modified by a query-dependent factor. In one implementation, the processing device computes the query-dependent factor based at least partially on the plurality of scores. For example, the query-dependent factor may be a function of a statistical relationship derived from the plurality of scores (e.g., based on Eq. 5).

In one implementation, each of the scores of the subset of scores was previously modified by an additive factor prior to being modified with the query-dependent factor or prior to selecting the subset of search results.

At block 250, the processing device transmits search results associated with highest scores of the plurality of scores to the client device. The highest scores of the plurality of scores include both modified and unmodified scores. In some implementations, the highest scores of the plurality of scores are scores that satisfy a scoring condition (e.g., that a score meets a minimum threshold score, the score is within a top number of high scores, etc.). In one implementation, prior to transmitting to the client device, addition modification may be applied to the highest scores (e.g., in a similar fashion as described with respect to blocks 230 and 240) based on an associated content label (e.g., scores corresponding to youth-oriented search results). Once the client device receives the search results, a user of the client device may view the search results presented, for example, in a ranked list based on associated scores or associated relevance values. The ranked list may include links to content that the user may retrieve using the client device (e.g., from the content server 120).

Referring to FIG. 3, method 300 begins at block 310 when a processing device identifies a plurality of search results that are restricted to search results assigned either a youth-oriented content label or a general audience content label. Block 310 may be performed in a substantially similar manner as block 210, as described with respect to FIG. 2.

At block 320, the processing device selects a search result from the plurality of search results. At block 330, the processing device determines whether the selected search result is assigned a youth-oriented content label. If the selected search result is assigned a youth-oriented content label, then the method 300 proceeds to block 340. Otherwise, the method 300 proceeds to block 320.

At block 340, the processing device determines whether the selected search result has an associated relevance value that meets a relevance threshold. If the relevance value meets the relevance threshold, then the method 300 proceeds to block 340. Otherwise, the method 300 proceeds to block 320.

At block 350, the processing device multiplies a score associated with the selected search result by a boost factor (e.g., using the boost module 154). In one implementation, a boost factor is computed to be applied uniformly to each score. In one implementation, the boost factor is computed based at least partially on the scores associated with the plurality of search results (e.g., based on a statistical relationship of the scores, on an individual score associated with the selected search result, etc.). Block 340 may be performed in a substantially similar manner as block 240, as described with respect to FIG. 2

At block 360, the processing device determines if any unprocessed search results remain (e.g., any search results not evaluated by the processing device in one or more of blocks 330 or 340). If no unevaluated search results remain (e.g., all of the plurality of search results have been evaluated), the method 300 ends. Otherwise, the method 300 proceeds back to block 320, where the next search result is selected from the plurality of search results.

In some implementations, the processing device transmits the search results and their associated scores (including scores that were and were not multiplied by the boost factor) to the client device, in a similar fashion as block 250, as described above with respect to FIG. 2.

Referring to FIG. 4, the method 400 begins at block 410 when a processing device performs a search to generate a plurality of search results based at least partially on a content label type, with each of the plurality of search results being associated with one of a plurality of scores. For example, a search engine system (e.g., the search engine system 132) may receive a search query from a client device (e.g., one of the client devices 110A-110Z). The plurality of scores are computed by the processing device and assigned to each of the plurality of search results.

Some content identified during the search is excluded from the plurality of search results in order to pair down the identified content to a manageable list of search results. Various inclusion criteria may be used including, but not limited to, a score meeting a threshold score, a relevance value meeting a relevance threshold, etc. In some implementations, the content label type may correspond to content that is typically underrepresented and may potentially be excluded from the generated plurality of search results. In such implementations, content associated the content label type (e.g., content associated with a youth-oriented content label) may be "promoted" in such a way that they are included in the plurality of search results. For example, to improve the chances of the content meeting the inclusion criteria, content associated with the content label type may have an associated score or relevance value temporarily boosted during generation of the plurality of search results, or inclusion conditions may be lowered or relaxed entirely for content associated with the content label type (e.g., to guarantee that at least a pre-defined number of these search results are included). As another example, the processing device may stipulate that a pre-defined number of search results corresponding to the content label type are to be included in the plurality of search results.

At block 420, the processing device selectively modifies, based on the content label type, scores of the plurality of scores. The scores corresponding to search results associated with the content label type are modified (e.g., by an additive or multiplicative constant). In one implementation, the content label type is a youth-oriented content label (e.g., a "Y" rating). In one implementation, the scores are modified by a query-dependent factor. In some implementations, the selective modification is further based on a relevance factor (e.g., in a similar manner as block 220 described with respect to FIG. 2), in which the selective modification is applied to search result scores that are also associated with relevance values that meet a relevance threshold.

At block 430, the processing device selects a subset of search results of the plurality of search result scores based on one or more scoring conditions. For example, the scoring condition may be a condition that a score meets a minimum threshold score, that the score is within a top number of high scores, etc.

At block 440, the processing device transmits, to a client device, the subset of search results of the plurality of search results that are associated with the subset of scores. Block 440 may be performed in a substantially similar manner as block 250, as described with respect to FIG. 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Although implementations of the disclosure were discussed in terms of selectively modifying scores of content search results, the implementations may also be generally applied to any system in which sets of data within larger sets of data are to be selectively adjusted/modified. Thus, implementations of the disclosure are not limited to content search results.

Figure 5:
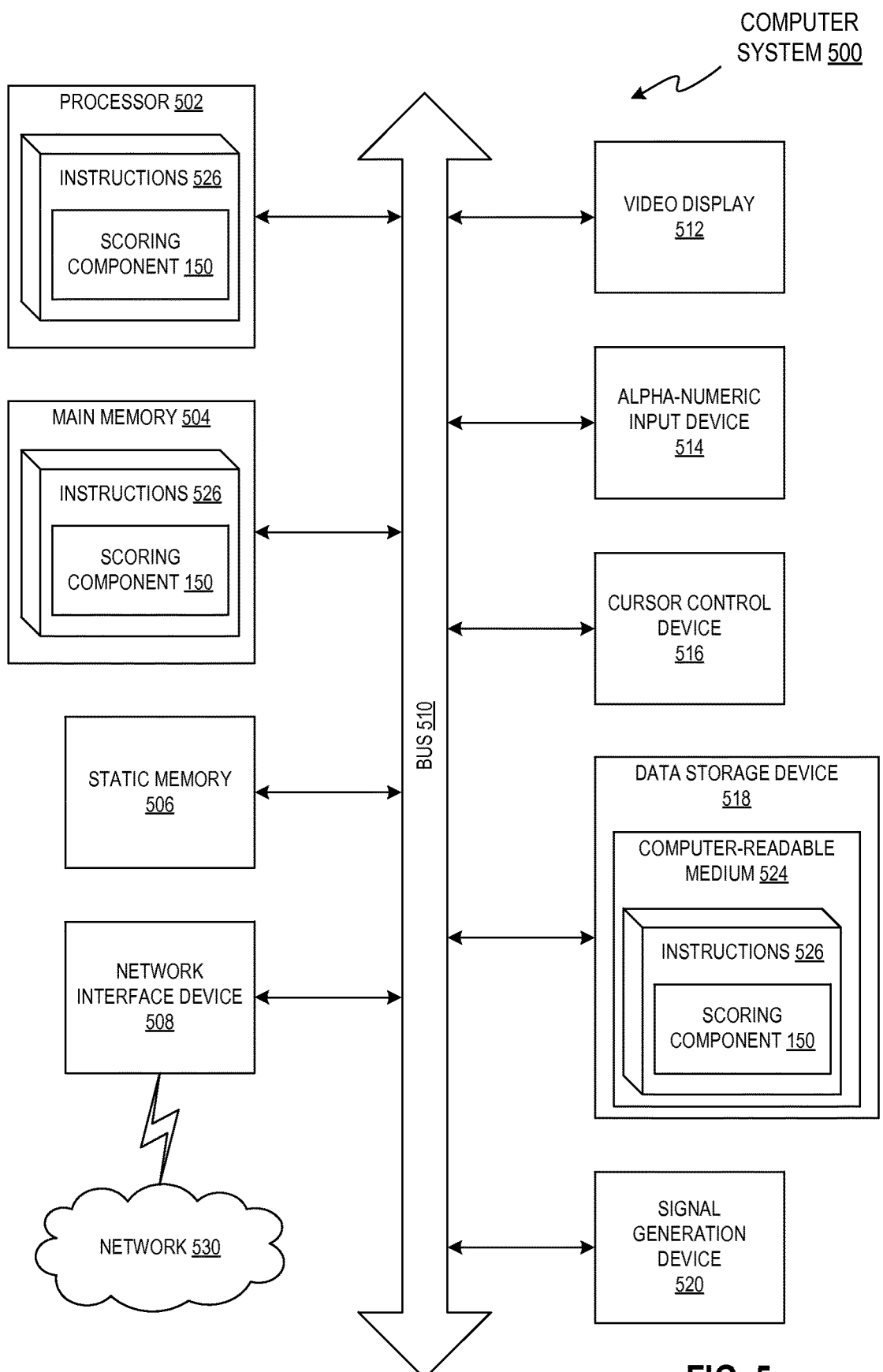
FIG. 5 is a block diagram illustrating an exemplary computer system in accordance with an implementation of the disclosure.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 500 may be utilized by or illustrative of any of the client devices 110A-110Z, the data store 106, the content server 120, and the search server 130.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 510.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 508. The computer system 500 also may include a video display unit 512 (e.g., a liquid crystal display (LCD), a cathode ray tube (CRT), or a touch screen), an alphanumeric input device 514 (e.g., a keyboard), a cursor control device 516 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 530 (e.g., the network 105) via the network interface device 508.

In one implementation, the instructions 526 include instructions for one or more scoring components 150, which may correspond to the identically-named counterpart described with respect to FIGS. 1A and 1B. While the computer-readable storage medium 524 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving", "transmitting", "generating", "adding", "substracting", "removing", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

identifying, by a processing device, a plurality of search results corresponding to a search query generated at a client device, each search result of the plurality of search results being associated with a content label and with one of a plurality of scores, wherein a first associated content label of at least one search result of the plurality of search results is indicative of youth-oriented content;

selecting, by the processing device, a first subset of search results and a second subset of search results within the plurality of search results, the first subset of search results being associated with the first associated content label and each search result of the first subset of search results having a first relevance value that meets a first relevance threshold, the second subset of search results being associated with a second associated content label and each search result of the second subset of search results having a second relevance value that meets a second relevance threshold;

selecting, by the processing device, a first subset of scores within the plurality of scores, the first subset of scores comprising scores associated with the first subset of search results;

computing, by the processing device, a first factor based at least partially on a first score of the first subset of scores and the first relevance value;

computing, by the processing device, a second factor based at least partially on a second score of a second subset of scores within the plurality of scores and the second relevance value, the second subset of scores comprising scores associated with the second subset of search results;

computing, based on the first factor and the second factor, a query-dependent factor that is a function of a statistical relationship derived from the first subset of scores and the second subset of scores; and modifying, by the processing device, at least one of the first subset of scores based on the query-dependent factor.

2. The method of claim 1, further comprising:
selecting a third subset of scores corresponding to modified scores and unmodified scores within the plurality of scores that each meet a scoring condition; and
transmitting, to the client device, search results of the plurality of search results associated with the second subset of scores.

3. The method of claim 1, wherein modifying the at least one of the first subset of scores based on the query-dependent factor comprises:
modifying each score of the first subset of scores uniformly by the query-dependent factor.

4. The method of claim 1, wherein the identified plurality of search results is restricted to search results each having an associated content label selected from a first content label type and a second content label type.

5. The method of claim 1, wherein selecting the first subset of the plurality of search results comprises:
selecting, as the first subset, search results having associated content labels indicative of youth-oriented content.

6. The method of claim 1, wherein each search result of the first subset of search results is associated with the first relevance value, and wherein selecting the first subset of the plurality of search results comprises:
identifying search results having the first relevance value that meets the first relevance threshold.

7. The method of claim 1, wherein the first relevance value is based on one or more of:
a likelihood indicating that a respective search result is relevant to the search query; or
a measure of evidence indicating that the respective search result is relevant for the search query.

8. A non-transitory machine-readable medium having instructions encoded thereon that, when executed by a processing device, cause the processing device to:
identify a plurality of search results corresponding to a search query generated at a client device, each search result of the plurality of search results being associated with a content label and with one of a plurality of scores, wherein a first associated content label of at least one search result of the plurality of search results is indicative of youth-oriented content;
select a first subset of search results and a second subset of search results within the plurality of search results, the first subset of search results being associated with the first associated content label and each search result of the first subset of search results having a first relevance value that meets a first relevance threshold, the second subset of search results being associated with a second associated content label and each search result of the second subset of search results having a second relevance value that meets a second relevance threshold;
select a first subset of scores within the plurality of scores, the first subset of scores comprising scores associated with the first subset of search results;
compute a first factor based at least partially on a first score of the first subset of scores and the first relevance value;

compute a second factor based at least partially on a second score of a second subset of scores within the plurality of scores and the second relevance value, the second subset of scores comprising scores associated with the second subset of search results;
compute, based on the first factor and the second factor, a query-dependent factor that is a function of a statistical relationship derived from the first subset of scores and the second subset of scores; and
modify at least one of the first subset of scores based on the query-dependent factor.

9. The non-transitory machine-readable medium of claim 8, wherein to select the subset of the plurality of search results, the instructions further cause the processing device to:
select a third subset of scores corresponding to modified scores and unmodified scores within the plurality of scores that each meet a scoring condition; and
transmit, to the client device, search results of the plurality of search results associated with the second subset of scores.

10. The non-transitory machine-readable medium of claim 8, wherein to modify the at least one of the first subset of scores based on the query-dependent factor, the processing device is further to:
modify each score of the first subset of scores uniformly by the query-dependent factor.

11. The non-transitory machine-readable medium of claim 8, wherein the identified plurality of search results is restricted to search results each having an associated content label selected from a first content label type and a second content label type.

12. The non-transitory machine-readable medium of claim 8, wherein to select the first subset of the plurality of search results, the instructions further cause the processing device to:
select, as the first subset, search results having associated content labels indicative of youth-oriented content.

13. The non-transitory machine-readable medium of claim 8, wherein each search result of the first subset of search results is associated with the first relevance value, and wherein to select the first subset of the plurality of search results, the instructions further cause the processing device to:
identify search results having the first relevance value that meets the first relevance threshold.

14. A system comprising:
a memory; and
a processing device communicatively coupled to the memory, wherein the processing device is to:
identify a plurality of search results corresponding to a search query generated at a client device, each search result of the plurality of search results being associated with a content label and with one of a plurality of scores, wherein a first associated content label of at least one search result of the plurality of search results is indicative of youth-oriented content;
select a first subset of search results and a second subset of search results within the plurality of search results, the first subset of search results being associated with the first associated content label and each search result of the first subset of search results having a first relevance value that meets a first relevance threshold, the second subset of search results being associated with a second associated content label and each search result of the second subset of search results having a second relevance value that meets a second relevance threshold;

select a first subset of scores within the plurality of scores, the first subset of scores comprising scores associated with the first subset of search results;

compute a first factor based at least partially on a first score of the first subset of scores and the first relevance value;

compute a second factor based at least partially on a second score of a second subset of scores within the plurality of scores and the second relevance value, the second subset of scores comprising scores associated with the second subset of search results;

computing, based on the first factor and the second factor, a query-dependent factor that is a function of a statistical relationship derived from the first subset of scores and the second subset of scores; and modify at least one of the first subset of scores based on the query-dependent factor.

15. The system of claim 14, wherein the processing device is further to:

select a third subset of scores corresponding to modified scores and unmodified scores within the plurality of scores that each meet a scoring condition; and transmit, to the client device, search results of the plurality of search results associated with the second subset of scores.

16. The system of claim 14, wherein to modify the at least one of the first subset of scores based on the query-dependent factor, the processing device is further to:

modify each score of the first subset of scores uniformly by the query-dependent factor.

17. The system of claim 14, wherein the identified plurality of search results is restricted to search results each having an associated content label selected from a first content label type and a second content label type.

18. The system of claim 14, wherein to select the first subset of the plurality of search results, the processing device is further to:

select, as the first subset, search results having associated content labels indicative of youth-oriented content.

19. The system of claim 14, wherein each search result of the first subset of search results is further associated with the first relevance value, and wherein to select the first subset of the plurality of search results, the processing device is further to:

identify search results having the first relevance value that meets the first relevance threshold.

* * * * *